3,094,979
HEATING DEVICES OPERATED WITH
LIQUID FUEL
Hartwig Volbehr, Lochhan, near Munich, Rudolf Reinhardt, Krailling, near Munich, and Adalbert Neuschl, Stockdorf, near Munich, all of Bavaria, Germany, assignors to Webasto Werk G.m.b.H., Stockdorf, near Munich, Germany
Filed Aug. 16, 1961, Ser. No. 131,859
Claims priority, application Switzerland Sept. 3, 1960
9 Claims. (Cl. 126—110)

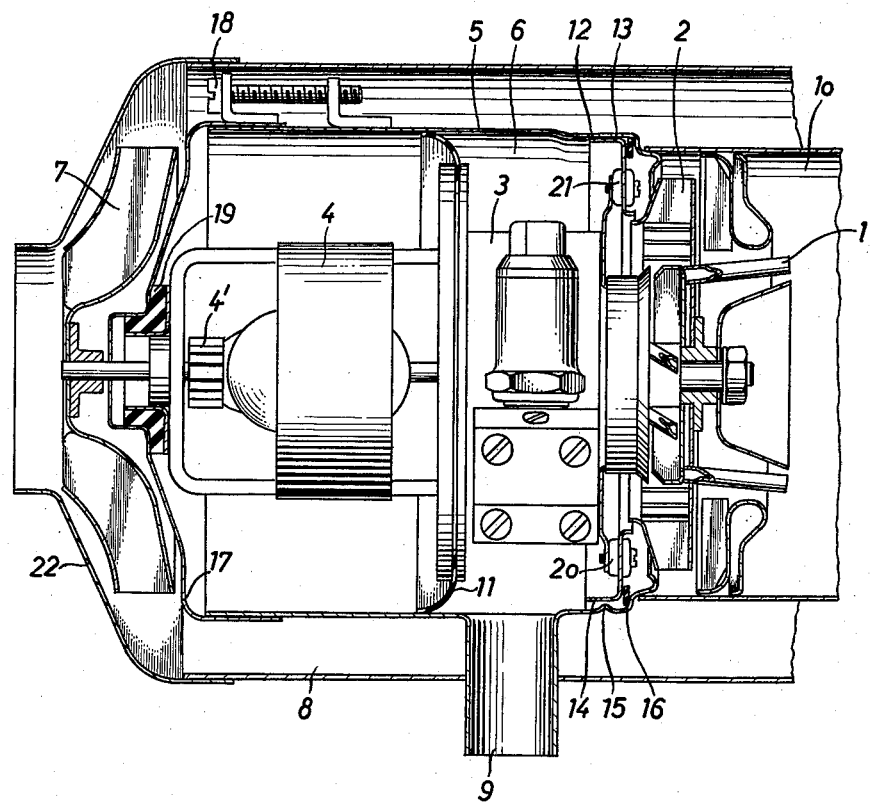

This invention relates to heating devices operated with liquid fuel, intended more especially for motor vehicles, and equipped with a driving motor, a rotary atomiser, a blower for the air for combustion, and a blower for air to be heated. The parts mentioned above are all mounted coaxially to one another on the motor shaft, and the burner unit which includes the driving motor, the blower for the air for combustion, and the rotary atomiser, lies inside a tubular casing surrounded by an annular duct for the air to be heated.

Various types of heating devices of this kind are already known, but they all have the disadvantage that they are relatively complicated both to fit and to dismantle, and their maintenance is therefore difficult.

The present invention aims at providing a burner of the aforesaid type which avoids the disadvantages mentioned, and in addition has the advantage of quiet running.

According to the invention a burner unit is constructed with outside dimensions such that it can be inserted without difficulty into the tubular casing from one end, and when inserted is held against a stop by a member fastened to it.

Easy insertion is preferably ensured by using a circular-cylindrical tubular casing, the member joined to the burner unit and located against the stop being also circular, while just in front of the stop the tubular casing has a reduced length of circular-cylindrical section into which the cylindrical counter-stop member on the burner unit fits.

The centering of the unit to prevent its turning inside the tubular casing is most simply effected by means of a groove in the counter-stop member engaging a projection in the tubular casing, or vice-versa.

To press the member fastened on the burner unit against the stop, a removable cover may be provided at the insertion end of the tubular casing, and, for example, urged towards the stop by means of screws acting between it and the tubular casing.

According to a further feature of the invention the counter-stop member may be connected to the burner unit through an elastic component. Reduction of noise transmission may also be improved by fitting an elastic component between the device e.g. the cover pressing the burner unit against the stop, and the burner unit. The invention is particularly advantageous in connection with heating devices in which the burner unit is also provided with a fuel pump, since the pump can be replaced almost as easily as if it were fitted outside the apparatus, although it is better protected inside the apparatus, and the intensity of the pump noises is also considerably reduced.

Since the space intended to receive the burner unit is in communication with the combustion chamber, there might be a danger that when the burner is switched off, oil vapours could reach the commutator of the driving motor. In order to retain the advantage of simple fitting of the heating device according to the invention, while avoiding this danger, it is arranged according to another feature of the invention, that in heating devices in which an air suction pipe is passed through the annular duct for the air to be heated, to the space housing the burner unit and the inlet point of this suction pipe, the location of this inlet point is so selected that, viewed in the direction of insertion of the burner unit, it lies behind the commutator of the driving motor but in front of the blower for the air for combustion, and a seal of elastic material is provided which sub-divides the space housing of the burner unit. The sub-division is effected in such a manner that the commutator of the driving motor is spacially separated from the inlet of the air suction pipe and the blower for the air for combustion.

In a preferred overall construction incorporating the aforesaid feature according to the invention, the arrangement of the parts of the heating device in the following sequence has been found particularly advantageous: rotary atomiser, blower for the air for combustion, fuel pump, driving motor, elastic intermediate member, cover closing the space housing of the unit, and the blower for the air to be heated.

In the following description with reference to the accompanying drawing, showing one example a heating device according to the invention, still further advantages and features of the invention will be indicated.

In the heating device illustrated in the aforesaid drawings, a rotary atomiser 1 (preferably constructed as a finger atomiser), a blower 2 for the air for combustion, a fuel pump 3 and a driving motor 4 are disposed inside a chamber 6 formed by a tubular casing 5 of circular cross-section and intended to receive the burner unit composed of the above mentioned parts. On the end of the motor shaft is mounted a blower 7 which delivers air to be heated through an annular duct 8 surrounding the chamber 6 to a heat exchanger (not shown). The air for combustion, sucked in by the blower 2, passes through an air suction pipe 9 into the chamber 6 and is there fed to a combustion chamber 10. The commutator 4' of the driving motor 4 is preferably spacially separated from the path of the air for combustion by a flanged, annular seal 11.

By means of a cylindrical portion 12 of reduced diameter in the casing 5 and a similar cylindrical counter-stop member 13 connected to the burner unit, centering of the parts of the unit is achieved and rotation prevented with the aid of a groove 14 in the stop member 13 engaging a projection 15, of the portion 12 of the casing. In order to secure the unit, the member 13 is pressed against a stop 16 formed by a further constriction of the casing 5. This may be effected by a closure cover 17 of the chamber 6, which by a screw device 18 is pressed against the driving motor 4 in the direction of the stop 16 through an elastic washer member 19. In order to reduce the noises of the motor and pump, use may be made not only of the elastic member 19 and the flanged seal 11, but also of elastic connections 20 and 21, by which the counter-stop member 13 is fastened to the burner unit. When the cover 22 of the outer enclosure is removed, the burner unit, with the cover 17 and the blower 7 for air to be heated can easily be introduced into the chamber 6, since the counter-stop member 13 has a diameter which is smaller than the casing 5, by the amount of the portion 12 having a reduced diameter. On account of the elastic members 20 and 21, substantial tolerance may also be allowed between the constriction and the diameter of the counter-stop member 13.

It will be seen that in a heating device according to the invention the burner unit can be accurately and simply centered, fixed, and with reduced noise transmission, by a few operations and without expensive aids. In addition, spacial separation of the motor commutator is provided, by which the simple fitting resulting from the invention is in no way rendered more difficult.

The invention is not restricted solely to the example described, but may be modified and supplemented in any desired manner.

What we claim is:

1. A heating device operated with liquid fuel for motor vehicles comprising a first blower for air to be heated; a tubular casing having an annular outer housing in spaced coaxial relation about the outer surface thereof defining an annular heating air duct; a burner unit mounted within said casing including a driving motor, a second blower for combustion air, and a rotary atomizer; said first blower and said burner unit mounted coaxially with respect to one another and operatively connected to said drive motor; stop means secured to the inner surface of said casing and extending radially inwardly; a stop member connected to said burner unit engaging said stop means for maintaining said burner unit within said casing; and means for urging said stop member against said stop means.

2. A heating device as claimed in claim 1, wherein said tubular casing, and said stop member connected to said burner unit and engaging against said stop means are of circular cylindrical shape, and said tubular casing has in front of said stop means a portion of reduced diameter into which stop member of said burner unit fits.

3. A heating device as claimed in claim 2, wherein said casing and said stop member are provided with a cooperating groove and projection, whereby said casing and said stop member are secured against relative rotation.

4. A heating device as claimed in claim 1, wherein said stop member fastened to said burner unit is pressed against said stop means by a cover which is provided at the insertion end of said tubular casing and which is urged in the direction of said stop means.

5. A heating device as claimed in claim 1, wherein said stop member is connected to said burner unit by elastic means.

6. A heating device as claimed in claim 1, comprising an elastic washer member between said cover effecting the pressing of said burner unit against said stop means and said burner unit.

7. A heating device as claimed in claim 1, wherein said burner unit is also provided with a fuel pump.

8. A heating device as claimed in claim 7, including an elastic washer member disposed between said means for urging said stop means of said burner unit against said stop means wherein the parts of the heating device are located in the following sequence: rotary atomiser, blower for the air for combustion, fuel pump, driving motor, elastic intermediate member, closure cover of the chamber housing the unit, and the blower for air to be heated.

9. A heating device as claimed in claim 1, wherein said stop means consists of a reduced diameter portion of said tubular casing.

References Cited in the file of this patent
UNITED STATES PATENTS

| | | |
|---|---|---|
| 2,107,819 | Faber | Feb. 8, 1938 |
| 2,239,068 | Wood | Apr. 22, 1941 |
| 2,757,662 | Baier et al. | Aug. 7, 1956 |